(12) United States Patent
Gaither

(10) Patent No.: US 11,052,811 B2
(45) Date of Patent: Jul. 6, 2021

(54) MASS TRANSIT FOR PERSONAL VEHICLES

(71) Applicant: Toyota Motor Engineering & Manufacturing North America, Inc., Plano, TX (US)

(72) Inventor: Geoffrey D. Gaither, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 355 days.

(21) Appl. No.: 15/967,203

(22) Filed: Apr. 30, 2018

(65) Prior Publication Data

US 2019/0329692 A1    Oct. 31, 2019

(51) Int. Cl.
*B60P 3/07* (2006.01)
*B60P 3/06* (2006.01)
*G06Q 10/02* (2012.01)
*B60L 53/00* (2019.01)
*G01C 21/34* (2006.01)
*A61G 3/08* (2006.01)

(52) U.S. Cl.
CPC .............. *B60P 3/06* (2013.01); *B60L 53/00* (2019.02); *G06Q 10/02* (2013.01); *A61G 3/0808* (2013.01); *B60L 2200/24* (2013.01); *G01C 21/3438* (2013.01)

(58) Field of Classification Search
CPC ......... B60P 3/06; A61G 3/0808; A61G 5/125; A61G 5/128; A61G 3/061; A61G 5/043; A61G 2203/14; G06Q 10/02; B60L 53/12; B60L 53/00; B60L 2200/24; B60L 2240/70; G01C 21/3438
See application file for complete search history.

(56) References Cited

U.S. PATENT DOCUMENTS

| | | | |
|---|---|---|---|
| 3,785,514 A | 1/1974 | Forsyth et al. | |
| 3,874,308 A | 4/1975 | Michahelles | |
| 3,933,258 A | 1/1976 | Forsyth et al. | |
| 6,241,308 B1 | 6/2001 | Gaspard, II et al. | |

(Continued)

FOREIGN PATENT DOCUMENTS

| | | |
|---|---|---|
| EP | 2572992 | 3/2013 |
| NL | 1012102 | 11/2000 |
| WO | WO2010060196 | 6/2010 |

*Primary Examiner* — Toan C To
(74) *Attorney, Agent, or Firm* — Snell & Wilmer L.L.P.

(57) ABSTRACT

A system includes a platform designed to mechanically support a plurality of personal vehicles. The system also includes a power source coupled to the platform and designed to at least one of store or generate power to propel the platform. The system also includes an actuator coupled to the platform and designed to facilitate transfer of the plurality of personal vehicles from a ground surface to the platform. The system also includes a plurality of transmitters each coupled to the platform and designed to transmit an electrical charge to an energy storage device of one of the plurality of personal vehicles. The system also includes a platform electronic control unit (ECU) coupled to the power source and the plurality of transmitters and designed to control the power source to transmit at least some of the power to, the plurality of personal vehicles via the plurality of transmitters.

18 Claims, 13 Drawing Sheets

(56) References Cited

U.S. PATENT DOCUMENTS

| | | | |
|---|---|---|---|
| 6,283,040 B1* | 9/2001 | Lewin | B60P 3/08 |
| | | | 105/393 |
| 6,363,857 B1* | 4/2002 | Kauffman | B61B 15/00 |
| | | | 104/88.01 |
| 6,419,036 B1 | 7/2002 | Miglia | |
| 6,857,833 B1* | 2/2005 | Rains | B60P 3/08 |
| | | | 410/26 |
| 8,074,576 B2 | 12/2011 | Farooq | |
| 8,195,382 B2 | 6/2012 | Bowen et al. | |
| 8,616,135 B2 | 12/2013 | Clark | |
| 9,056,556 B1* | 6/2015 | Hyde | B60L 58/20 |
| 10,683,676 B2* | 6/2020 | Richardson | E04H 6/422 |
| 2010/0104392 A1* | 4/2010 | Bowen | B60P 3/08 |
| | | | 410/26 |
| 2012/0078672 A1 | 3/2012 | Mohebbi et al. | |
| 2013/0049677 A1* | 2/2013 | Bouman | B60L 53/11 |
| | | | 320/106 |
| 2013/0073327 A1 | 3/2013 | Edelberg | |
| 2016/0023701 A1 | 1/2016 | Bryant | |
| 2016/0055743 A1 | 2/2016 | Raj | |

* cited by examiner

MASS TRANSIT FOR PERSONAL VEHICLES

BACKGROUND

1. Field

The present disclosure relates to systems and methods for facilitating mass transit of personal vehicles and charging of the personal vehicles during the mass transit.

2. Description of the Related Art

Mass transit systems have been around for quite some time. Conventional mass transit systems include buses, trains, and the like that transport individual riders between hub locations. Such systems may be convenient when utilized in high density areas where the hub locations are conveniently located such that the individuals can walk to a first hub location from a starting location and walk to their final destination from a second hub location. However, such mass transit systems are less useful in relatively rural settings in which walking distances between starting locations, hubs, and final destinations are relatively long. Furthermore, such mass transit systems may be relatively user unfriendly to handicapped individuals.

A benefit of mass transit systems is a reduction in pollution because less vehicles are combusting fuel and creating exhaust. The rise of electrical vehicles further reduces pollution because such electric vehicles do not combust fuel. However, electrical vehicles have well-known limitations such as limited driving ranges, relatively long charge times, and the like.

Thus, there is a need for systems and methods for improved mass transit systems.

SUMMARY

Described herein is a system for facilitating mass transit of personal vehicles. The system includes a platform designed to mechanically support a plurality of personal vehicles. The system also includes a power source coupled to the platform and designed to at least one of store or generate power to propel the platform. The system also includes an actuator coupled to the platform and designed to facilitate transfer of the plurality of personal vehicles from a ground surface to the platform. The system also includes a plurality of transmitters each coupled to the platform and designed to transmit an electrical charge to an energy storage device of one of the plurality of personal vehicles. The system also includes a platform electronic control unit (ECU) coupled to the power source and the plurality of transmitters and designed to control the power source to transmit at least some of the power to the plurality of personal vehicles via the plurality of transmitters.

Also disclosed is a personal vehicle compatible with a mass transit system. The personal vehicle includes a frame designed to be mechanically coupled to a platform of the mass transit system. The personal vehicle also includes an energy storage device designed to store electricity. The personal vehicle also includes a motor generator coupled to the energy storage device and designed to convert the electricity into mechanical power to propel the frame. The personal vehicle also includes a receiver coupled to the energy storage device and designed to receive an electrical charge to charge the energy storage device. The personal vehicle also includes a personal vehicle network access device designed to transmit and receive signals. The personal vehicle also includes a personal electronic control unit (ECU) coupled to the personal vehicle network access device. The personal ECU is designed to determine a starting location and a destination location, and to control the personal vehicle network access device to transmit a request for a ride on the platform of the mass transit system for a portion of a route between the starting location and the destination location.

Also disclosed is a method for mass transit of personal vehicles. The method includes receiving, by a processor, a reservation request corresponding to a request for a platform to deliver a personal vehicle from a starting location to a destination location. The method also includes traveling, by the platform, to the starting location. The method also includes assisting, by an actuator, movement of the personal vehicle from a ground surface to a location coupled to the platform. The method also includes providing, by a transmitter coupled to the platform, electrical energy to an energy storage device of the personal vehicle while the platform is in motion. The method also includes traveling, by the platform, from the starting location to the destination location. The method also includes assisting, by the actuator, movement of the personal vehicle from the location coupled to the platform to the ground surface at the destination location.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for providing mass transit to personal vehicles. The systems provide various benefits and advantages. For example, the systems include mass transit platforms that transport multiple personal vehicles between different points or locations. The ability to transport multiple personal vehicles provides the advantage of reducing total energy usage by the personal vehicles to get between their starting locations and their destination locations. The platforms advantageously include transmitters that are designed to transmit an electrical charge to each of the personal vehicles. This provides the advantage of extending a total range of the electric personal vehicles because not only are the vehicles transported along a portion of a route without using charge, but they can also be recharged while being transported. The systems provide additional benefits and advantages such as including actuators that facilitate loading of the personal vehicles onto the platforms in such a manner as to reduce space between personal vehicles, thus allowing more personal vehicles to be loaded on a single platform.

An exemplary system includes a mass transit platform that includes a power source, such as an engine, a battery and a motor generator, a fuel-cell generator, or the like. The platform further includes an actuator that facilitates movement of personal vehicles onto the platforms. The platforms also include transmitters that facilitate transfer of electric charge from the power source to the personal vehicles in order to charge the personal vehicles. The platforms also include platform electronic control units (platform ECUs) that may control operation of various components of the mass transit platform. The system may also include a reservation server that may receive a reservation request from a personal vehicle and determine a route for the personal vehicle from a starting location to a final destination. The reservation server may further determine a meeting point (and a meeting time) at which the personal vehicle will become loaded on a mass transit platform, and a destination point (and a destination time) at which the personal vehicle will depart from the mass transit platform to complete its route on its own.

Figure 1:
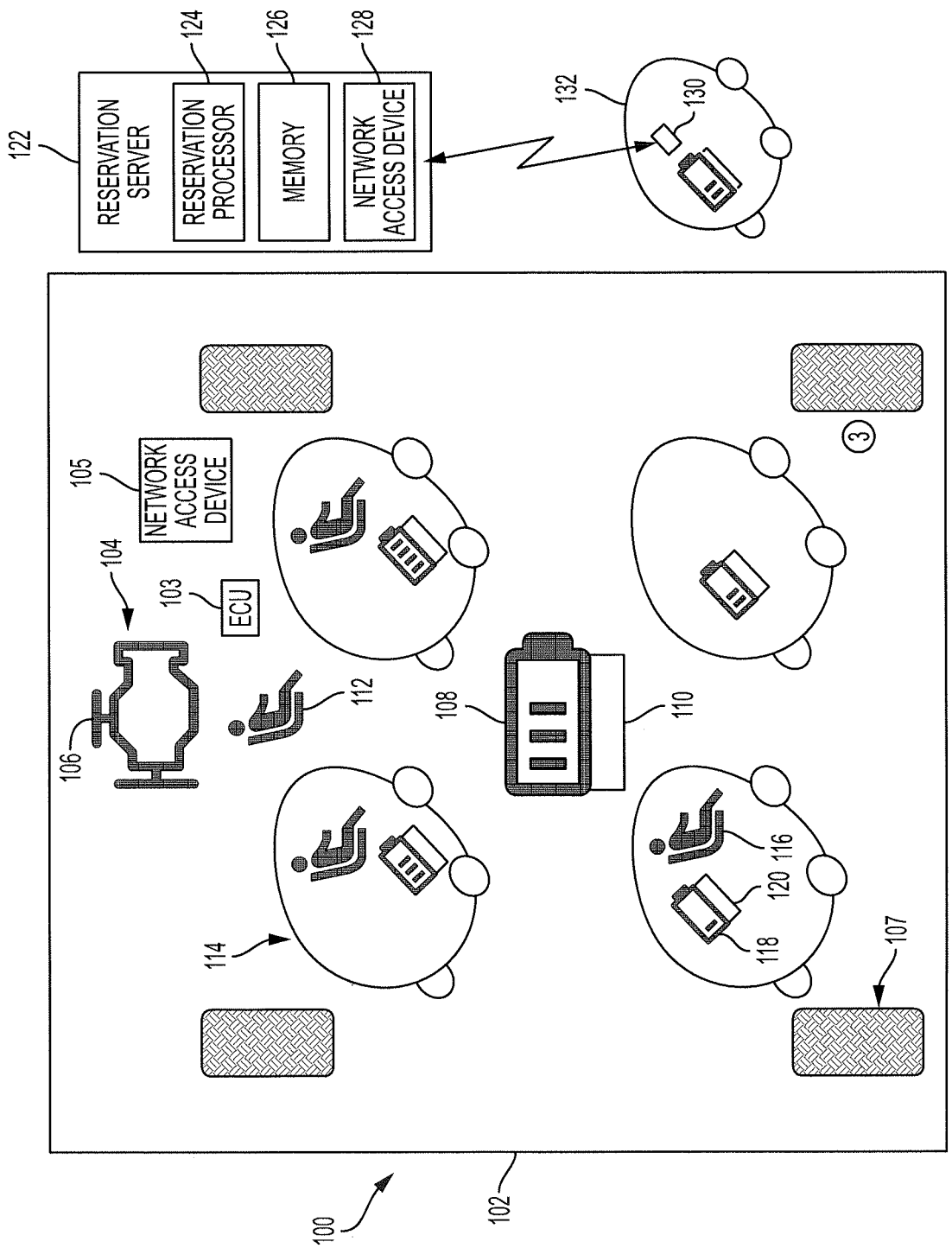
FIG. 1 is a block diagram illustrating a system for providing mass transit to personal vehicles according to an embodiment of the present invention.

Turning to FIG. 1, a mass transit system 100 is shown. Rather than simply transporting individuals, the mass transit system 100 is designed to transport personal vehicles. The mass transit system 100 includes a platform 102, a platform ECU, a network access device 105, and a power source 104 that is designed to move the platform 102 relative to earth. The power source 104 may include an engine 106, a battery 108, and a motor generator 110.

The system 100 further includes a set of operator controls 112 (i.e., an input device). The operator controls 112 may be used to control operation of the power source 104, and to further control driving operations of the platform 102.

The system 100 further includes a plurality of personal vehicles 114. The personal vehicles 114 may include any personal vehicles capable of transporting one or more person. Each of the personal vehicles may include operator controls 116 (i.e., an input device), an energy storage device 118, and a motor generator 120.

The system 100 may further include a reservation server 122. The reservation server 122 may be used to reserve a use of the mass transit system 100. The reservation server 122 may include a reservation processor 124, a memory 126, and a network access device 128.

The platform 102 may be supported by wheels 107 and may support multiple personal vehicles 114. In that regard, the power source 104 may be coupled to the platform 102 and may propel the platform 102 (with the personal vehicles 114 positioned on or otherwise coupled to the platform 102) relative to a ground surface.

The platform ECU 103 may be coupled to each of the components of the platform 102 and may include one or more processors or controllers, which may be specifically designed for automotive systems. The functions of the platform ECU 103 may be implemented in a single ECU or in multiple ECUs. The platform ECU 103 may receive data, may make determinations based on the received data, and may control the operation of components based on the determinations.

In some embodiments, the platform 102 may be fully autonomous or semi-autonomous. In that regard, the platform ECU 103 may control various aspects of the platform 102 (such as steering, braking, accelerating, or the like) to maneuver the platform 102 from a starting location to a destination location.

The network access device 105 may include any port or device capable of facilitating communications between the platform ECU 103 and an external device (such as the reservation server 122). For example, the network access device 105 may communicate via Wi-Fi, Bluetooth, a cellular protocol, a vehicle to vehicle protocol, 4G, 5G, or the like.

The engine 106 may convert a fuel, such as gasoline or diesel, into mechanical power. The mechanical power generated by the engine 106 may be used to propel the platform 102. The battery 108 may store electrical energy. The motor generator 110 may convert the electrical energy stored in the battery 108 into mechanical power to propel the platform 102. The motor generator 110 may likewise convert mechanical power (such as mechanical power generated by the engine 106 or received from the wheels 107) into electrical energy for storage in the battery 108.

The power source 104 may be further capable of providing an electrical charge to one or more of the plurality of personal vehicles 114 that are located on the platform 102. For example, electrical energy may be transferred from the battery 108 to the energy storage device 118 of one or more of the plurality of personal vehicles 114. As another example, electrical energy may be transferred from the motor generator 110 to the energy storage device 118 of one or more of the plurality of personal vehicles 114.

Because the platform 102 can support the plurality of personal vehicles 114 and move the plurality of personal vehicles 114 relative to a ground surface, the combination of the platform 102 and the power source 104 may function to provide mass transit to the personal vehicles 114. The system 100 may provide the additional advantage of providing electrical charge to the personal vehicles 114 during transport of the personal vehicles 114.

The network access device 128 of the reservation server 122 may include any network access device capable of communicating with a remote object, such as the platform 102. For example, the network access device 128 may communicate via Wi-Fi, Bluetooth, a cellular protocol, a vehicle to vehicle protocol, 4G, 5G, or the like.

The network access device 128 of the reservation server 122 may receive a reservation request from a network access device 130 of a personal vehicle 132. The reservation request may include, for example, a request for the personal vehicle 132 to meet the platform 102 at a specified location. The specified location may include a current location of the personal vehicle 132 or may include a predetermined meeting point, such as a central transportation hub. The reservation request may further include a destination location which may be a final destination of the personal vehicle 132 or a predetermined departing point that is closer to the final destination of the personal vehicle 132 than the predetermined meeting point.

The memory 126 may store instructions that are usable by the reservation processor 124 to handle reservations that are received by the reservation server 122. The reservation processor 124 may include a processor capable of scheduling routes of multiple platforms of the mass transit system 100 based on received reservation requests.

In response to receiving a reservation request from the personal vehicle 132, the reservation processor 124 may determine a meeting point and time at which the platform 102 will meet the personal vehicle 132. The reservation processor 124 may further determine a drop off point and time at which the platform 102 will drop off the personal vehicle 132. The reservation server 122 may transmit a message to the network access device 105 that includes the meeting point and time and the drop off point and time.

In some embodiments, the platform 102 may be autonomous. In that regard, the ECU 103 may control movement of the platform 102 to the meeting point. In some embodiments, the meeting point may be displayed on an output device and an operator may maneuver the platform 102 to the meeting point using the operator controls 112. In some embodiments, the network access device 128 of the reservation server 122 may transmit a message to the personal vehicle 132 indicating the location and time of the meeting point.

Figure 2A:
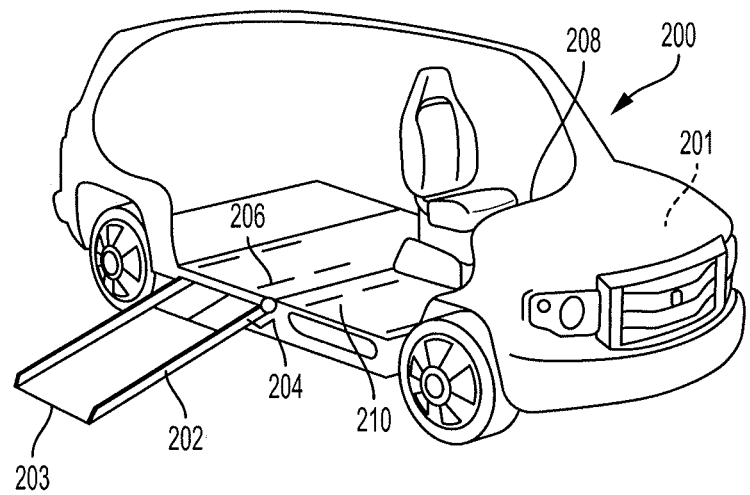
FIG. 2A illustrates an exemplary mass transit platform for providing mass transit to personal vehicles according to an embodiment of the present invention.
Figure 2B:
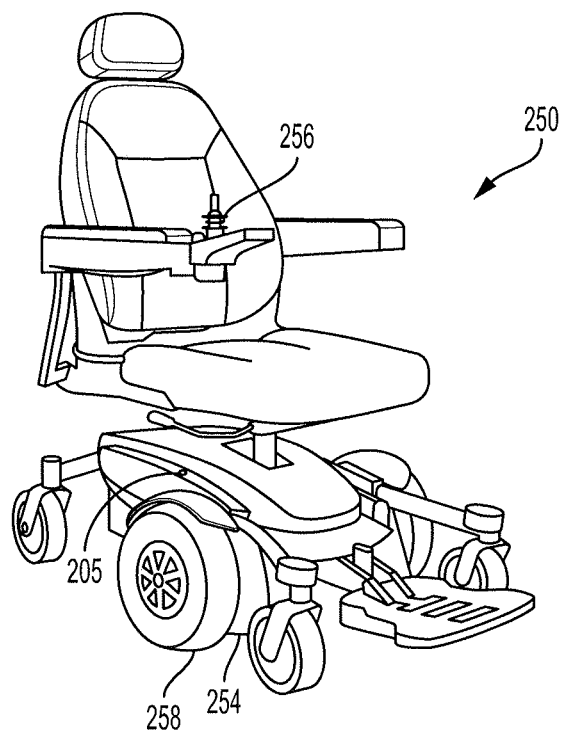
FIG. 2B illustrates an exemplary personal vehicle for use with a mass transit system according to an embodiment of the present invention.

Turning to FIGS. 2A and 2B, an exemplary platform 200 and personal vehicle 250 are shown. The platform 200 includes a power source 201. The power source 201 may include, for example, one or more of a battery, a motor generator, an engine, a fuel-cell generator, or the like. The power source 201 may propel the platform 200 relative to a ground surface 203.

The platform 200 may further include a ramp 202. The ramp 202 may extend from a raised surface 206 within the platform 200 to the ground surface 203. In that regard, the personal vehicle 250 may use the ramp 202 to maneuver itself from the ground surface 203 to the raised surface 206 of the platform 200.

The platform 200 may further include an actuator 204 coupled to the ramp 202. The actuator 204 may move the ramp 202 between an extended position (as shown) and a lifted position in which the ramp 202 is lifted above the ground surface 203. For example, the ramp 202 may be enclosed within a compartment of the platform 200 when it is in the lifted position. In that regard, the actuator 204 may facilitate transfer of the personal vehicle 250 from the ground surface 203 to the raised surface 206 of the platform 200.

The platform 200 may further include operator controls 208. The operator controls 208 may include any one or more input device usable to control operation of the platform 200. For example, the operator controls 208 may include a combination of a brake pedal, an accelerator pedal, a steering wheel, and a gear shifter.

The platform 200 may further include a wireless charging pad 210. The wireless charging pad 210 may transmit a wireless charging signal that may be used to charge an energy storage device of a personal vehicle.

The personal vehicle 250 may include an energy storage device 252 (such as a battery), a motor generator 254, and operator controls 256. The motor generator 254 may convert energy stored in the energy storage device 252 into mechanical power, such as torque, in order to drive wheels 258 of the personal vehicle 250.

The energy storage device 252 may receive a wireless charge from the wireless charging pad 210 of the platform 200. For example, as the platform 200 is traveling from a pickup location to a drop off location, the power source 201 may generate electrical energy that is transmitted to the energy storage device 252 via the wireless charging pad 210. In some embodiments, the power source 201 may only transmit electrical energy to the energy storage device 252 when an engine of the power source 201 is running or when the power source 201 is in a regenerative mode (i.e. such as during regenerative braking).

The operator controls 256 may include any input device for controlling operation of the personal vehicle 250 such as, for example, a joystick, voice controls, or the like.

Figure 2C:
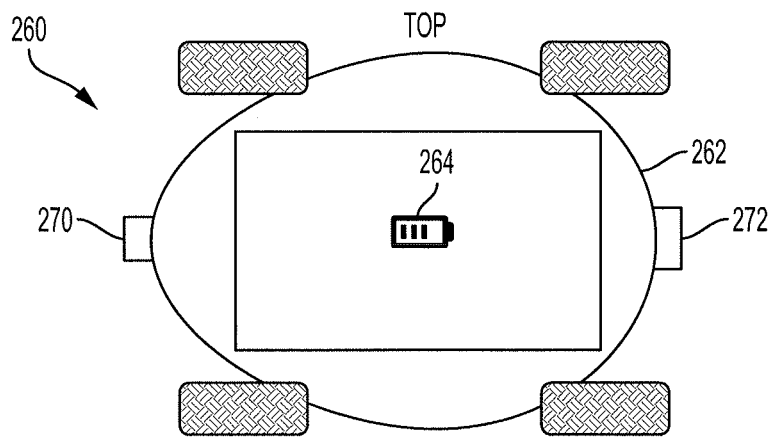
FIGS. 2C, 2D, and 2E illustrate a top view, a side view, and a back view, respectively, of a personal vehicle for use with a mass transit system according to an embodiment of the present invention.
Figure 2D:
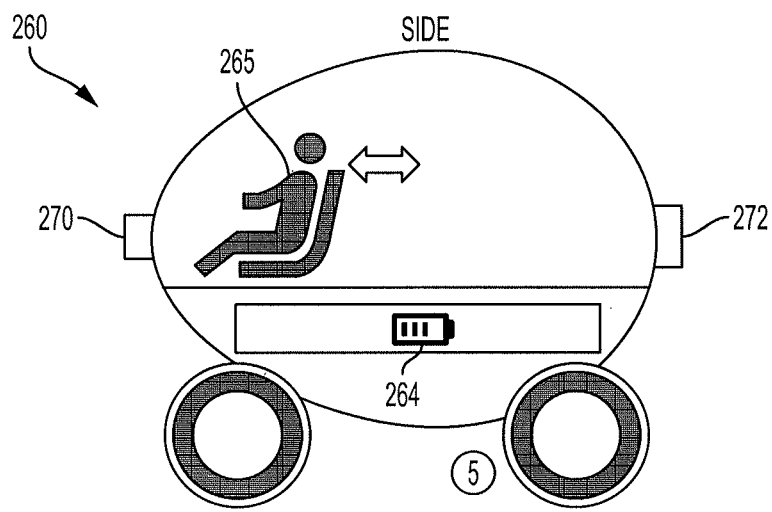
Figure 2E:
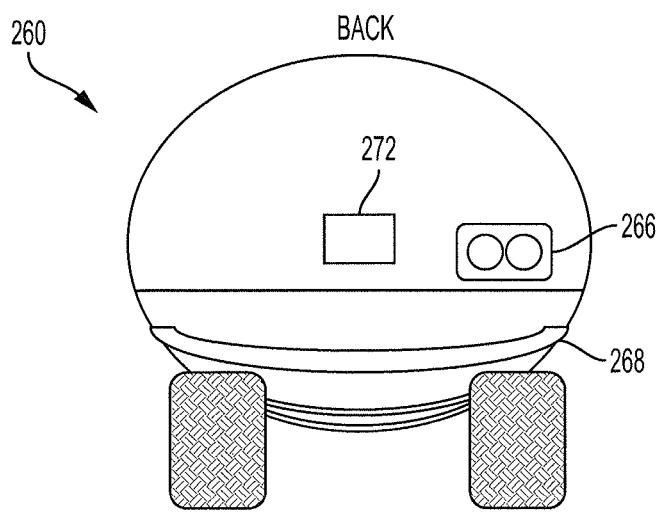

Turning now to FIGS. 2C, 2D, and 2E, another personal vehicle 260 is shown. The personal vehicle 260 includes a frame 262, a modular battery 264, operator controls 265, an electronic connector 266, contact rings 268, a first combined connector 270, and a second combined connector 272.

The frame 262 may include any frame that may or may not enclose a cockpit or other area in which a user may be located. For example, the frame 262 may resemble the frame of a vehicle, it may resemble the frame of a motorcycle, it may resemble the frame of a wheelchair, it may resemble the frame of a watercraft, it may resemble the frame of an aircraft, or the like.

The modular battery 264 may be referred to as a skateboard style battery. In that regard, the battery 264 may include multiple battery modules and may be capable of receiving additional battery modules in order to increase energy storage capacity of the modular battery 264. The modular battery 264 allows for scalability and compact size of the personal vehicle 260.

The operator controls 265 may include any one or more input devices usable to control operation of the personal vehicle 260. For example, the operator controls 265 may include a joystick, mouth controls, voice controls, a steering wheel, one or more pedals, or the like. In some embodiments, the personal vehicle 260 may be partially or fully autonomous. In that regard, an ECU of the personal vehicle 260 may control operation of the personal vehicle 260.

The personal vehicle 260 may be sufficiently large that it may accommodate a person of any dimensions. For example, the frame 262 may be sufficiently large that it may comfortably fit large individuals.

The electronic connector 266 may be coupled to the battery 264 and may be designed to receive an electric charge. In that regard, a transmitter of a platform may be connected to the electronic connector 266 and may be used to charge the battery 264.

The contact rings 268 may be designed to receive an electrical charge via contact with a transmitter or via inductive charging. In that regard, the contact rings 268 may be coupled to the battery 264 and may be used to charge the battery 264.

The first combined connector 270 may be located on or near a front of the personal vehicle 260. The first combined connector 270 may include a receiver for receiving an electrical charge to charge the modular battery 264. In some embodiments, the first combined connector 270 may further include a transmitter for transmitting electrical charge. The first combined connector 270 may further include a first mechanical connector. For example, the first mechanical connector may include a trailer hitch or other mechanical connector capable of mechanically coupling the frame 262 to a platform of a mass transit system (such as the platform 102 of FIG. 1) or to a frame of another personal vehicle.

The second combined connector 272 may be located on or near a rear of the personal vehicle 260. The second combined connector 272 may include a receiver for receiving an electrical charge to charge the modular battery 264, and may also include a transmitter for transmitting an electrical charge. The second combined connector 272 may further include a second mechanical connector. For example, the second mechanical connector may include a trailer hitch or other mechanical connector capable of mechanically coupling the frame 262 to a platform of a mass transit system or to a frame of another personal vehicle.

An exemplary mass transit system may include a plurality of personal vehicles such as the personal vehicle 260. For example, the mass transit system may include a first personal vehicle and a second personal vehicle. The first personal vehicle may be located in front of the second personal vehicle. The first combined connector 270 of the second personal vehicle may be mechanically and electrically connected to the second combined connector 272 of the first personal vehicle. Power generated by a power source of the first personal vehicle may be used to propel the first personal vehicle, and such propulsion may be carried through to the second personal vehicle in order to propel the second personal vehicle. In some embodiments, power may transfer between modular batteries 264 of the first personal vehicle and the second personal vehicle.

Another exemplary mass transit system may include a platform and one or more personal vehicle 260. The personal vehicle 260 may be mechanically and electrically connected to the platform via the first combined connector 270. In that regard, the platform may propel the personal vehicle 260 along a ground surface and may provide an electrical charge to the modular battery 264 of the personal vehicle 260 via the first combined connector 270.

Figure 3:
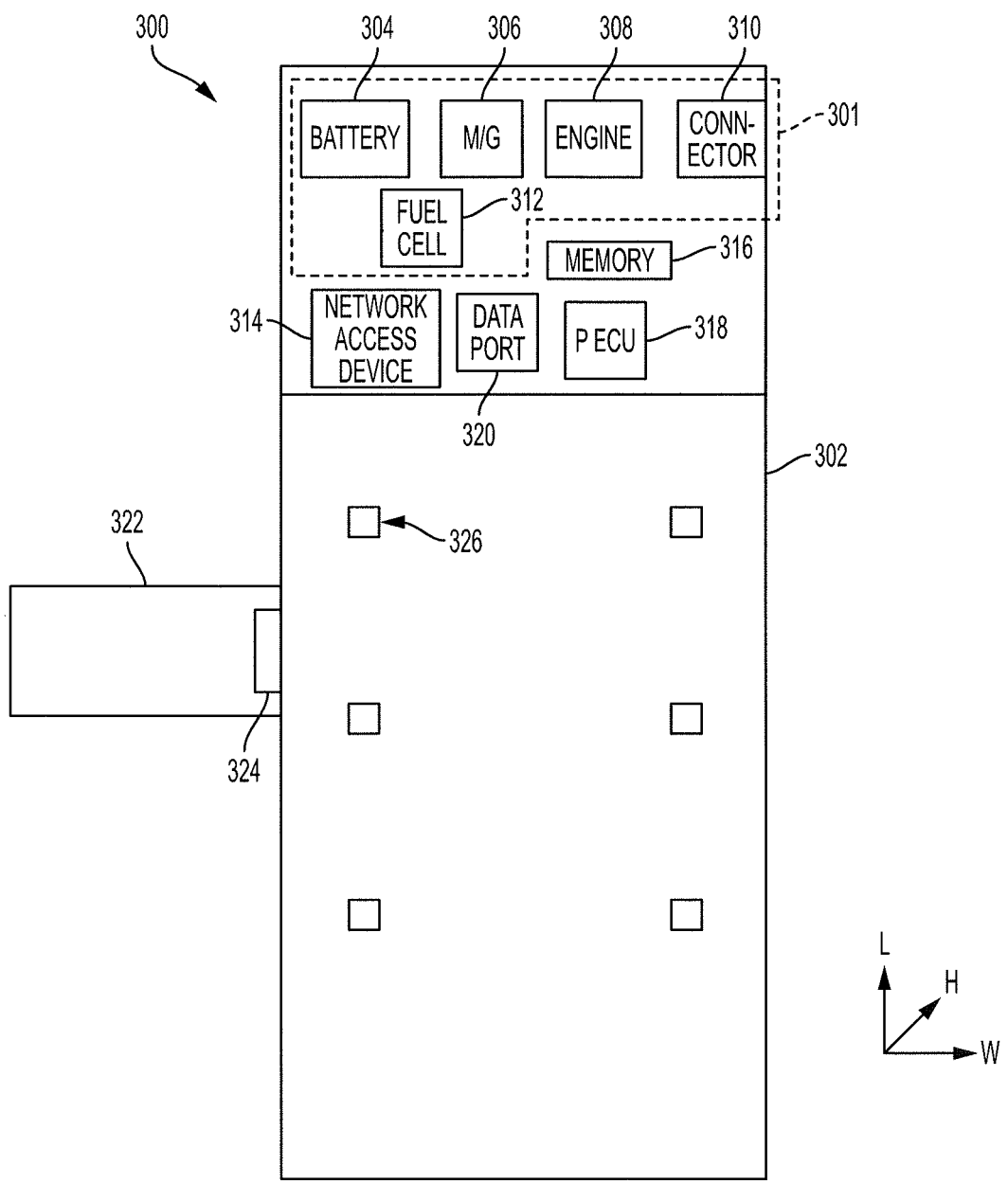
FIG. 3 is a block diagram illustrating an exemplary mass transit platform for use with a mass transit system, the mass transit platform including an actuator and a ramp according to an embodiment of the present invention.

Turning now to FIG. 3, an exemplary system 300 for facilitating mass transit of personal vehicles as shown. The system 300 includes a power source 301 coupled to a platform 302. The power source 301 is designed to generate power in order to propel the platform 302 relative to a ground surface. For example, the platform 302 may resemble a land craft (such as a truck, a train, or the like), a watercraft (such as a boat, a ferry, or the like), or an aircraft (such as a helicopter or an airplane). The power source 301 may propel the vehicle on land, through water, or through air.

An L-W-H axis is shown in various drawings to illustrate a length, width, and height direction, respectively, of various systems. Although length, width, and height are used herein, one skilled in the art will realize that the L-W-H axes may refer to any other directions without departing from the scope of the present invention. As used herein, the L direction refers to a direction between a front and a rear of the platform 302, the W direction refers to a direction perpendicular to the L direction and parallel to a ground surface, and the H direction refers to a direction perpendicular to the ground surface.

The power source 301 may include any one or more of a battery 304, a motor generator 306, an engine 308, a connector 310, or a fuel-cell generator 312. The battery 304 may include any energy storage device, such as a battery, a super capacitor, or the like, capable of storing electrical energy.

The motor generator 306 may receive electrical energy from the battery 304 (or from the fuel-cell generator 312) and may convert the electrical energy into mechanical power to propel the platform 302. The motor generator 306 may also receive mechanical power from the engine 308 or from motion of the platform 302 (such as during regenerative braking) and may convert the mechanical power into electrical energy for storage in the battery or other use.

The engine 308 may convert a fuel, such as gasoline or diesel, into mechanical power. The mechanical power may be used to propel the platform 302 or may be converted into electrical energy by the motor generator 306.

The connector 310 may include any electrical connector or receiver capable of receiving electrical energy. For example, the connector 310 may receive electrical energy from an external energy storage or generation device. In some embodiments, the platform 302 may resemble a cable car and the connector 310 may receive electrical energy from cables of a cable car system. In some embodiments, the platform 302 may be designed to meet personal vehicles at predetermined pickup or drop-off points. These pickup or drop-off points may include electrical connectors for transmitting electrical energy to the battery 304 via the connector 310. In that regard, the battery 304 may receive a charge while personal vehicles are loaded on the platform 302.

The fuel-cell generator 312 may include any fuel-cell generator capable of facilitating a chemical reaction to generate electricity. For example, the fuel-cell generator 312 may facilitate a reaction between hydrogen and oxygen which may result in electricity. The electricity may be provided to the motor generator 306 for conversion into mechanical power or may be provided to the battery 304 for storage.

The system 300 may further include a network access device 314, a memory 316, a platform ECU 318, and a data port 320.

The network access device 314 may include any network access device capable of communicating wirelessly. For example, the network access device 314 may be capable of communicating via Wi-Fi, Bluetooth, a cellular protocol, a vehicle to vehicle protocol, 4G, 5G, or the like.

The memory 316 may include any non-transitory memory known in the art. The memory 316 may store data usable by the platform ECU 318 to perform various functions, such as control the power source 301.

The platform ECU 318 may be coupled to each of the power source 301, the network access device 314, the memory 316, and the data port 320 and may communicate with each of these devices. The platform ECU 318 may include one or more processors or controllers, which may be specifically designed for automotive systems. The functions of the platform ECU 318 may be implemented in a single ECU or in multiple ECUs. The platform ECU 318 may receive data, may make determinations based on the received data, and may control the operation of components based on the determinations.

In various embodiments, the system 300 may be autonomous. In that regard, the platform ECU 318 may control the power source 301 and various actuators coupled to the platform 302 to drive the platform 302 from a starting location to a destination location.

The data port 320 may receive data from one or more personal vehicles coupled to the platform 302 or from the network access device 314. In some embodiments, the data received by the data port 320 may correspond to control operations of the platform 302. In that regard, the platform ECU 318 may control the power source 301 and other actuators coupled to the platform 302 to navigate the platform 302 relative to a ground surface based on data received by the data port 320. For example, a personal vehicle may be situated on the platform 302 in such a position that a driver of the personal vehicle can see a roadway in front of the platform 302. The personal vehicle may include operator controls that may receive input corresponding to requested control operations, and may transmit the requested control operations to the platform ECU 318 via the data port 320. In that regard, the operator controls of the personal vehicle may be used to drive the platform 302.

The system 300 may further include a ramp 322 coupled to the platform 302. The ramp 322 may provide a surface upon which personal vehicles may move from the ground surface onto the platform 302. The system 300 may further include an actuator 324 coupled to the ramp 322. The actuator 324 may cause the ramp 322 to actuate between a lowered position in which the ramp 322 contacts the ground surface and a raised position in which the ramp 322 is raised above the ground surface.

In some embodiments, the actuator 324 may cause the ramp 322 to move in one or more of the length direction or the width direction. In that regard, if a personal vehicle located near the front of the platform 302 wishes to depart the platform, the actuator 324 may move the ramp 322 to a location proximate to the personal vehicle near the front of the platform 302, and may then actuate the ramp 322 to the lowered position to allow the personal vehicle to move from the platform 302 to the ground surface. The actuator 324 may then actuate the ramp 322 to another location relative to the platform 302 to allow another personal vehicle to depart the platform 302.

The system 300 may further include a plurality of transmitters 326. The plurality of transmitters 326 may each be coupled to the power source 301 and may each receive electrical energy from the power source 301. For example, the transmitters 326 may receive electrical energy from one or more of the battery 304, the motor generator 306, the connector 310, or the fuel-cell generator 312.

The transmitters 326 may each be designed to be coupled to a personal vehicle and to transfer electrical energy to the personal vehicle. In that regard, as the platform 302 is transporting personal vehicles between locations, the personal vehicles may receive an electronic charge from the transmitters 326.

In some embodiments, the transmitters 326 may be bidirectional and may thus receive electrical energy from the personal vehicles. In that regard, the personal vehicles may transfer electrical energy to one or more of the power source 301 or to other personal vehicles. For example, if a first personal vehicle has an energy storage device that is fully charged and a second personal vehicle wishes to purchase electrical energy, the first personal vehicle may sell or transfer some of its electrical energy to the second personal vehicle.

As another example, multiple personal vehicles may be located on the platform 302 and coupled to the transmitter 326. It may be more energy efficient for the motor generator 306 of the platform 302 to transport the personal vehicles than for each of the personal vehicles to transport themselves. In that regard, the personal vehicles may each transmit some electrical energy to the motor generator 306 in order to generate mechanical power to propel the platform 302 along a common route of the personal vehicles.

Figure 4:
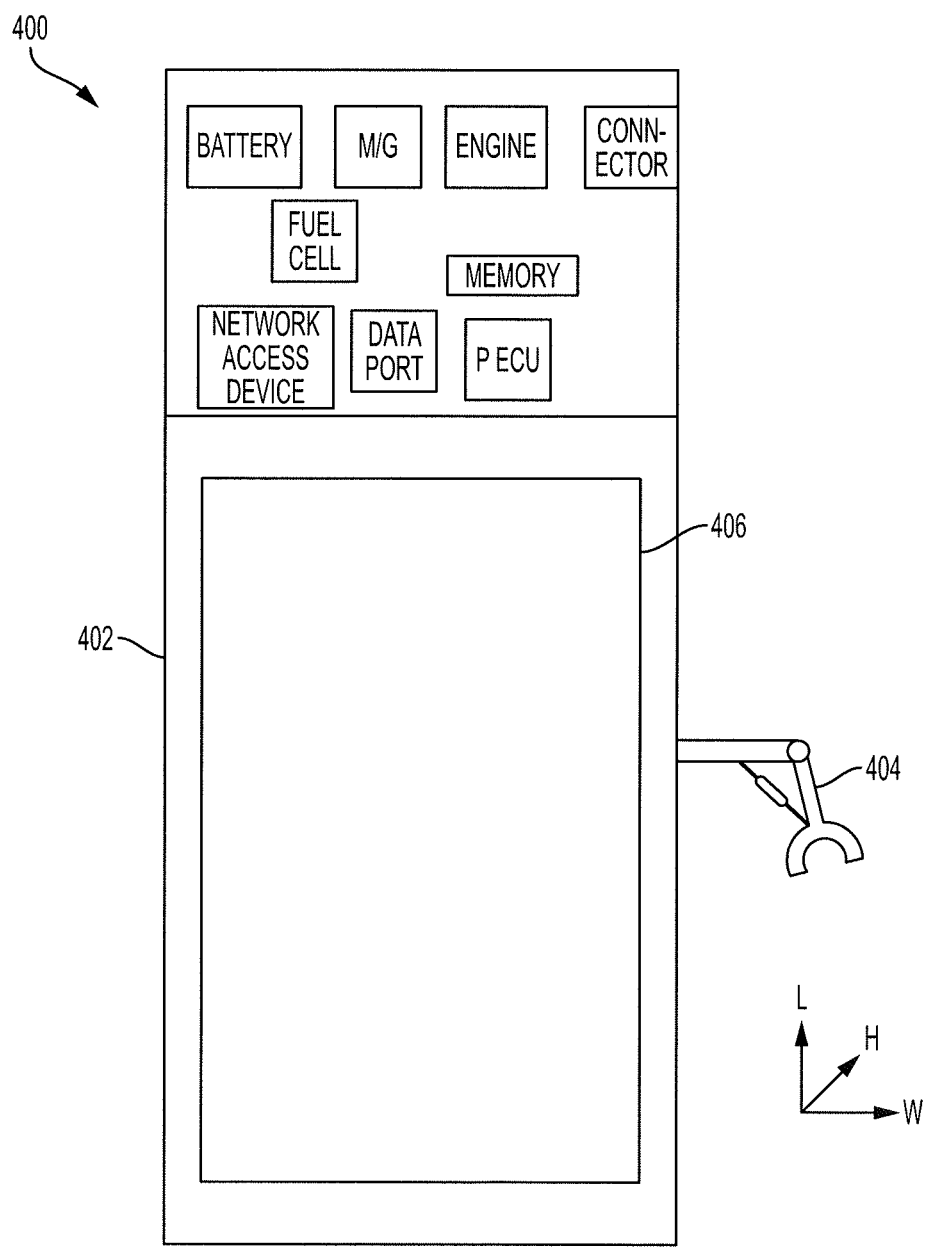
FIG. 4 is a block diagram illustrating an exemplary mass transit platform for use with a mass transit system, the mass transit platform including a robot arm according to an embodiment of the present invention.

Turning now to FIG. 4, another system 400 for facilitating mass transit of personal vehicles is shown. The system 400 may be similar to the system 300 of FIG. 3. However, instead of including a ramp and an actuator, the platform 402 includes a robot arm 404. The robot arm 404 may include any one or more actuator capable of lifting a personal vehicle from a ground surface and placing the personal vehicle on the platform 402. In that regard, the system 400 may receive a request for a personal vehicle to be transported on the platform 402 and the robot arm 404 may move the personal vehicle from the ground surface to the platform 402 in response to receiving such a request. Likewise, when the platform 402 has reached a destination location of the personal vehicle, the robot arm 404 may move the personal vehicle from the platform 402 back to the ground surface.

The robot arm 404 may include any feature, such as a controllable magnet or a gripper, for gripping and releasing the personal vehicles. For example, the gripper may grip a vehicle, the robot arm 404 may place the vehicle in the desired location on the platform 402, and the gripper may release the vehicle.

The system 400 may further include a wireless charging pad 406. The wireless charging pad 406 may transmit a wireless charging signal that may be received by personal vehicles. In that regard, personal vehicles that are being transported on the platform 402 may receive the wireless charging signal to increase electrical energy stored in a corresponding energy storage device.

Figure 5:
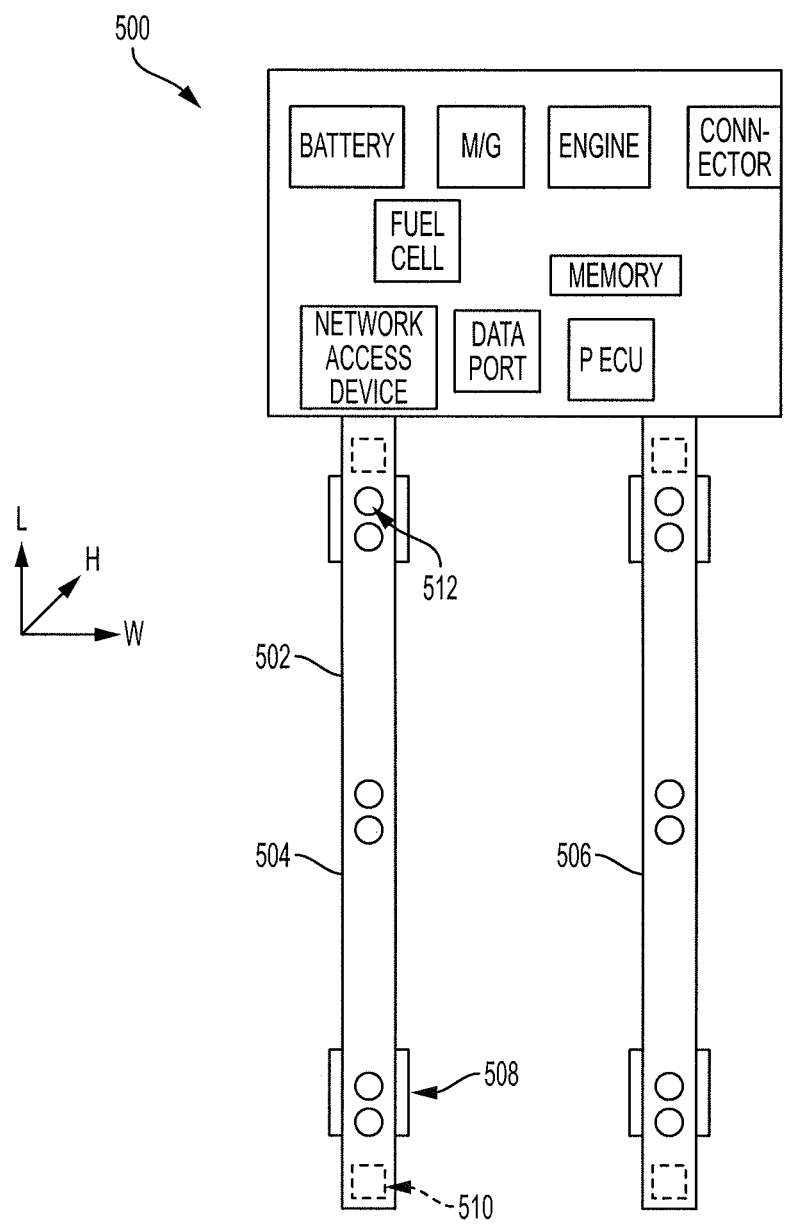
FIG. 5 is a block diagram illustrating an exemplary mass transit platform for use with a mass transit system, the mass transit platform having a pair of shafts that actuate along a height direction according to an embodiment of the present invention.

Turning now to FIG. 5, another system 500 for facilitating mass transit of personal vehicles is shown. The system 500 is similar to the system 400 of FIG. 4. The system 500 includes a platform 502 that includes a first longitudinal beam 504 and a second longitudinal beam 506. Each of the longitudinal beams 504, 506 are supported by wheels 508.

Each of the longitudinal beams 504, 506 includes actuators 510 that actuate the corresponding beam 504, 506 in the height direction. In that regard, the beam 504 actuators 510 may actuate the beam 504 in a downward direction (i.e., the negative H direction) to allow a personal vehicle to become loaded on the platform 502. A center of the personal vehicle may be aligned with the beam 504 while the beam 504 is lowered. Once the personal vehicle is in a desired location relative to the beam 504, the actuators 510 may raise the beam 504 (i.e., actuate the beam 504 in the positive H direction) to lift the personal vehicle above the ground surface.

Each of the beams 504, 506 may further include pairs of transmitters 512. Each pair of transmitters 512 may include a positive electrical contact and a negative electrical contact that may contact corresponding contact rings of a personal vehicle. Each pair of transmitters may transmit an electrical charge to a personal vehicle via contact with the corresponding contact rings of the personal vehicle.

Figure 6:
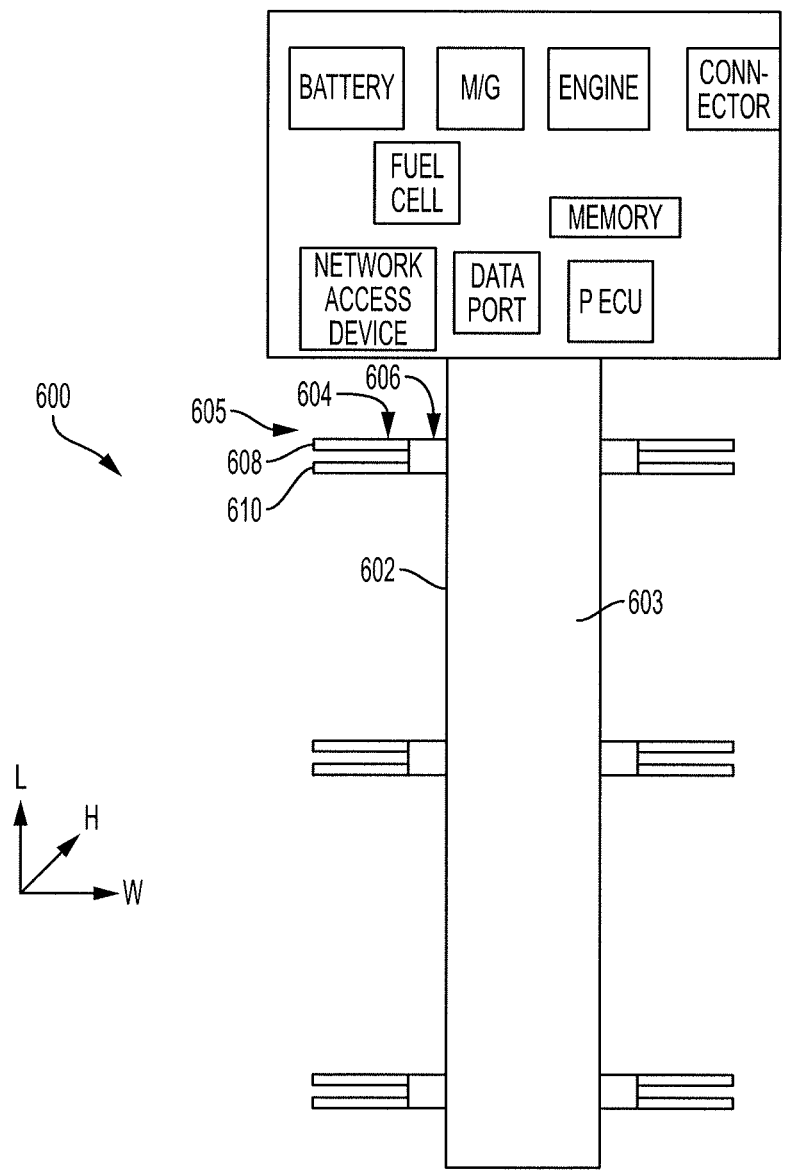
FIG. 6 is a block diagram illustrating an exemplary mass transit platform for use with a mass transit system, the mass transit platform having multiple transmitter/actuator pairs according to an embodiment of the present invention.

Turning now to FIG. 6, another system 600 for mass transit of personal vehicles is shown. The system 600 includes a platform 602 that includes a center shaft 603 and a plurality of lifters 605. Each of the lifters 605 includes an actuator 606 and a transmitter 604 that includes a first prong 608 and a second prong 610. The actuator 606 is designed to actuate the prongs 608, 610 along the height direction. In that regard, the actuator 606 may actuate the prongs 608, 610 in the negative H direction to facilitate loading of a personal vehicle. The personal vehicle may position itself such that the prongs 608, 610 are located beneath the frame of the personal vehicle. Once the personal vehicle is in place, the actuator 606 may lift the prongs 608, 610 in the positive H direction, thus lifting the personal vehicle from the ground surface.

The prongs 608, 610 may function as electrical transmitters 604. For example, the first prong 608 may correspond to a negative electrical terminal and the second prong 610 may correspond to a positive electrical terminal (or vice versa). In that regard, the prongs 608, 610 may contact electrical contacts of the personal vehicle and may transmit an electrical charge to the personal vehicle via the electrical contacts of the personal vehicle.

Figure 7A:
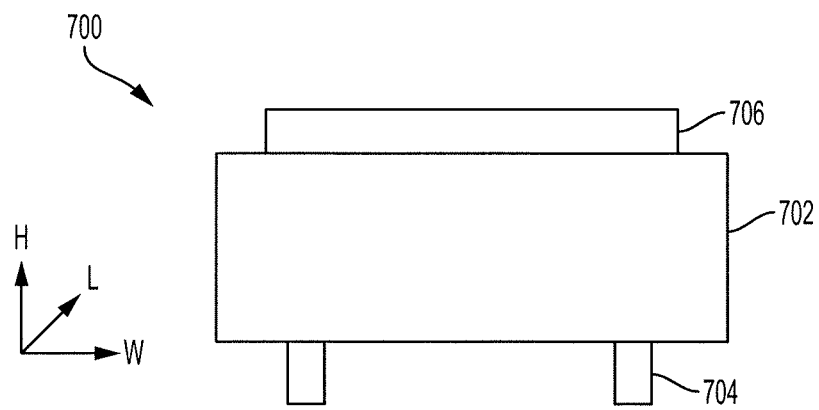
FIGS. 7A and 7B illustrate an exemplary vehicle loading bot for use with mass transit systems according to an embodiment of the present invention.
Figure 7B:
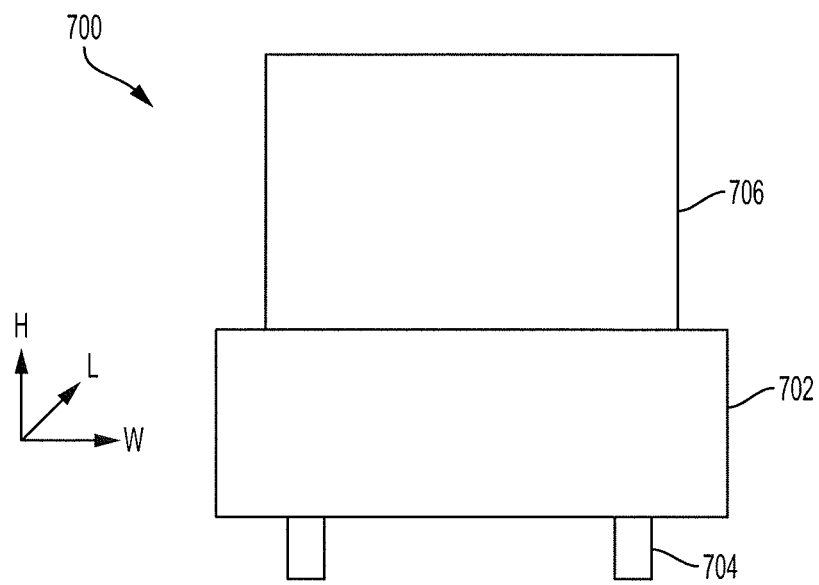

Referring now to FIGS. 3, 7A, and 7B, a vehicle loading bot 700 may be used with the system 300 to load personal vehicles onto the platform 302. The vehicle loading bot 700 may include a casing 702 that is supported by wheels 704. A motor (not shown) may propel the vehicle loading bot 700, and a controller (not shown) may control the motor and steering of the vehicle loading bot 700.

An actuator 706 may actuate between a lowered position (as shown in FIG. 7A) and a raised position (as shown in FIG. 7B). Stated differently, the actuator 706 may actuate along the H direction. When it is desirable to load a personal vehicle onto the platform 302, the actuator 324 may lower the ramp 322 to the lowered position to cause the ramp 322 to contact a ground surface. The vehicle loading bot 700 may move (using the wheels 704) from the platform 302 to a location beneath the personal vehicle via the ramp 322 while the actuator 706 is in the lowered position. The actuator 706 may then extend, thus raising the personal vehicle above the ground surface. The vehicle loading bot 700 may then transport the vehicle up the ramp 322 to a desired location on the platform 302. The actuator 706 may then lower itself to allow the personal vehicle to rest on the platform 302 and allow the vehicle loading bot 700 to perform a new action (such as load a new vehicle).

In some embodiments, the vehicle loading bot 700 may load personal vehicles on the platform 302 based on locations at which the personal vehicles will depart the platform 302. For example, the vehicle loading bot 700 may load personal vehicles that will remain on the platform 302 for longer periods of time closer to the middle of the platform 302 than personal vehicles that will depart the platform 302 at an earlier time. This allow personal vehicles to be transported off of the platform 302 at their desired destinations without having to move around other vehicles that will remain on the platform 302 for longer periods of time.

Figure 8:
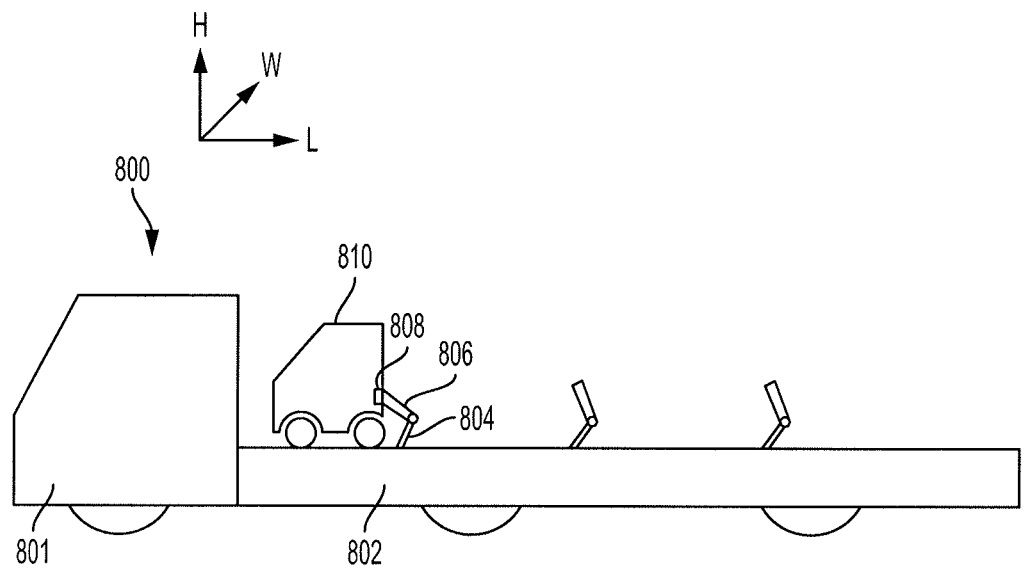
FIG. 8 is a block diagram illustrating an exemplary mass transit platform having a plurality of transmitters and transmitter actuators that automatically connect a transmitter to a receiver of a personal vehicle according to an embodiment of the present invention.

Turning now to FIG. 8, another system 800 for facilitating mass transit of personal vehicles is shown. The system 800 includes a power source 801 and a platform 802. The power source 801 may generate mechanical power for moving the platform 802 relative to a ground surface, and may generate or store electrical energy to be transferred to personal vehicles.

As shown, a personal vehicle 810 is loaded on the platform 802. The personal vehicle 810 includes a receiver 808 that is designed to interface with a transmitter 804. The transmitter 804 may transmit an electrical charge to the receiver 808 in order to charge an energy storage device (not shown) of the personal vehicle 810.

The system 800 may further include a transmitter actuator 806 coupled to the transmitter 804. The transmitter actuator 806 may include a controller and be designed to connect the transmitter 804 to the receiver 808. For example, the transmitter actuator 806 may include a camera, a proximity sensor, a magnet, or other sensor capable of detecting a location of the receiver 808. Based on the detected location of the receiver 808, the controller of the transmitter actuator 806 may actuate the transmitter 804 until the transmitter 804 is electrically connected to the receiver 808. Similarly, when the platform 802 has reached a point at which the personal vehicle 810 will depart, the transmitter actuator 806 may cause the transmitter 804 to disconnect from the receiver 808.

Figure 9:
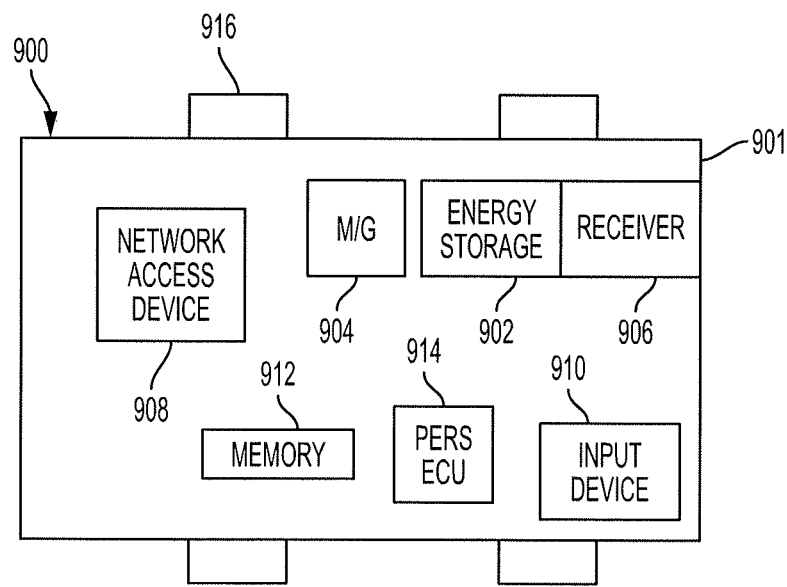
FIG. 9 is a block diagram illustrating an exemplary personal vehicle for use with a mass transit system according to an embodiment of the present invention.

Turning now to FIG. 9, a personal vehicle 900 is shown. The personal vehicle 900 includes a frame 901 that may be supported by wheels 916. The personal vehicle 900 may further include an energy storage device 902 and a motor generator 904. The personal vehicle 900 may further include a receiver 906, a network access device 908, an input device 910, a memory 912, and a personal ECU 914.

The frame 901 may include any frame capable of housing some or all of the components of the personal vehicle 900. The frame 901 may further include one or more features capable of allowing the frame to be mechanically coupled to a platform of a mass transit system. For example, the personal vehicle 900 may include a gearing system including a park gear that causes the wheels 916 to resist movement relative to a platform (such as the platform 102 of FIG. 1) during movement of the platform. As another example, the frame 901 may include a combined connector such as the combined connector 270 of FIG. 2C.

The energy storage device 902 may include any energy storage device capable of storing electrical energy. For example, the energy storage device 902 may include a battery, a super capacitor, or the like.

The motor generator 904 may receive the electrical energy stored in the energy storage device 902 and convert the electrical energy into torque to propel the vehicle via the wheels 916. In some embodiments, the motor generator 904 may convert torque received via the wheels 916 into electrical energy for storage in the energy storage device 902.

The receiver 906 may include any electrical connector capable of receiving an electrical charge, such as from a transmitter coupled to a platform. For example, the receiver 906 may include a plug capable of being coupled to the transmitter 804 of FIG. 8. In some embodiments, the receiver 906 may include a wireless charge receiver capable of wirelessly receiving an electrical charge.

The network access device 908 may include any network access device capable of communicating with a remote device, such as with the network access device 105 of the platform 102 of FIG. 1 or the network access device 128 of the reservation server 122 of FIG. 1.

The input device 910 may include any input device capable of receiving user input. For example, the input device 910 may include a joystick, a steering wheel, an accelerator or brake pedal, or the like usable to control operation of the personal vehicle 900. In some embodiments, the user input received from the input device 910 may be transmitted to a platform ECU coupled to a platform and be used to control driving operation of the platform.

The memory 912 may include any non-transitory memory known in the art. The memory 912 may store instructions usable by the personal ECU 914 to perform instructions.

The personal ECU 914 may include any ECU capable of performing functions corresponding to the personal vehicle 900. For example, the personal ECU 914 may control operations of the energy storage device 902, the motor generator 904, the receiver 906, the network access device 908, the input device 910, and the memory 912.

Figure 10A:
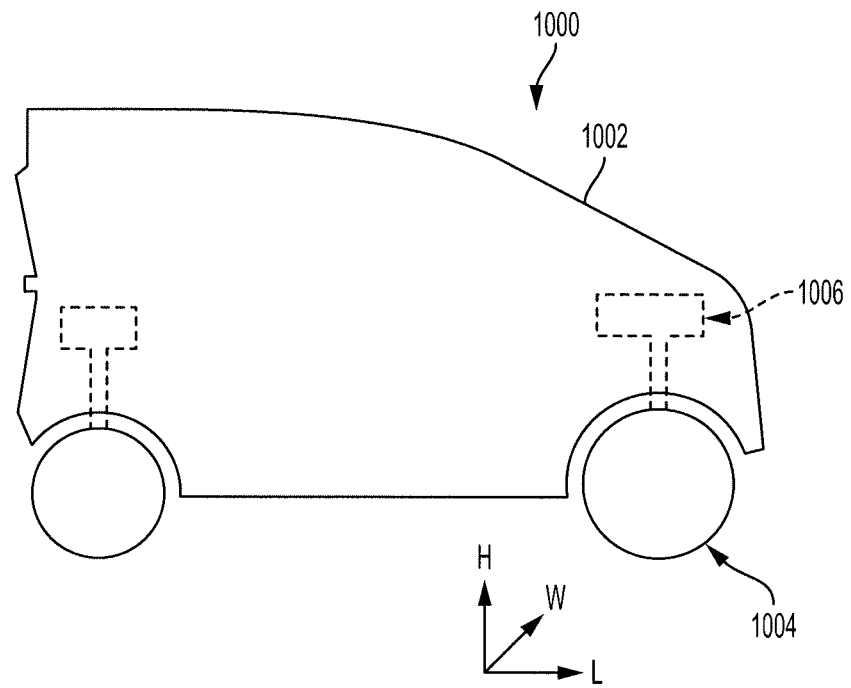
FIGS. 10A and 10B are drawings illustrating an exemplary personal vehicle having wheels and actuators coupled to the wheels and designed to draw the wheels into a frame of the personal vehicle according to an embodiment of the present invention.
Figure 10B:
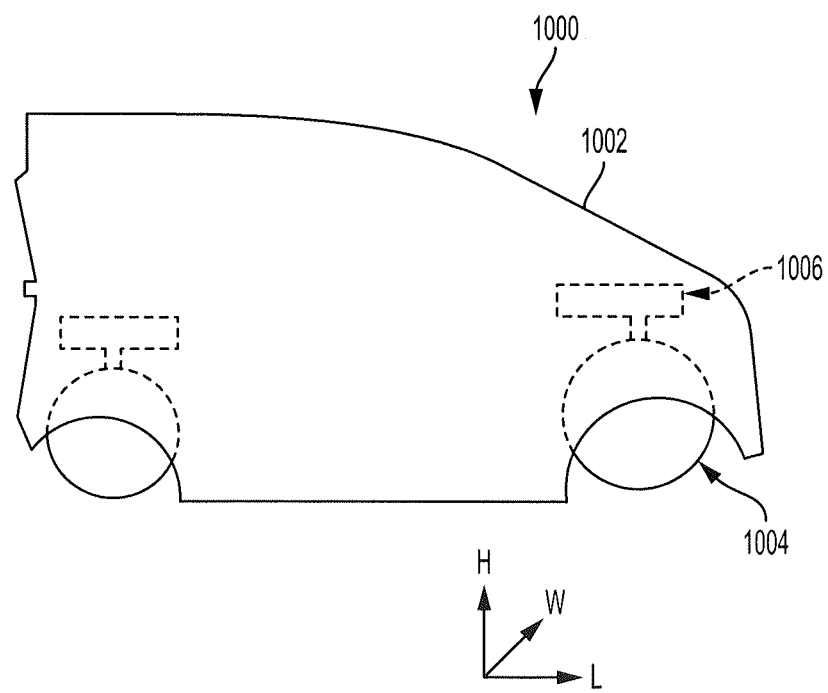

Turning now to FIGS. 10A and 10B, another personal vehicle 1000 is shown. The personal vehicle 1000 includes a frame 1002 and multiple wheels 1004 each coupled to an actuator 1006. The frame 1002 may be designed to be supported by a platform. For example, the frame of 1002 may be supported by the platform 602 of FIG. 6.

Referring to FIGS. 6, 10A, and 10B, the personal vehicle 1000 may be maneuvered such that the frame 1002 is located above the first prong 608 and the second prong 610. However, instead of the actuator 606 actuating the prongs 608, 610 in the positive H direction, the actuators 1006 of the personal vehicle 1000 may actuate the wheels 1004 in the positive H direction (as shown in FIG. 10B), thus causing the frame 1002 to become supported above the ground surface by the first prong 608 and the second prong 610. In that regard, the wheels 1004 may be said to be concealed or collapsed within the frame 1002.

Figure 11A:
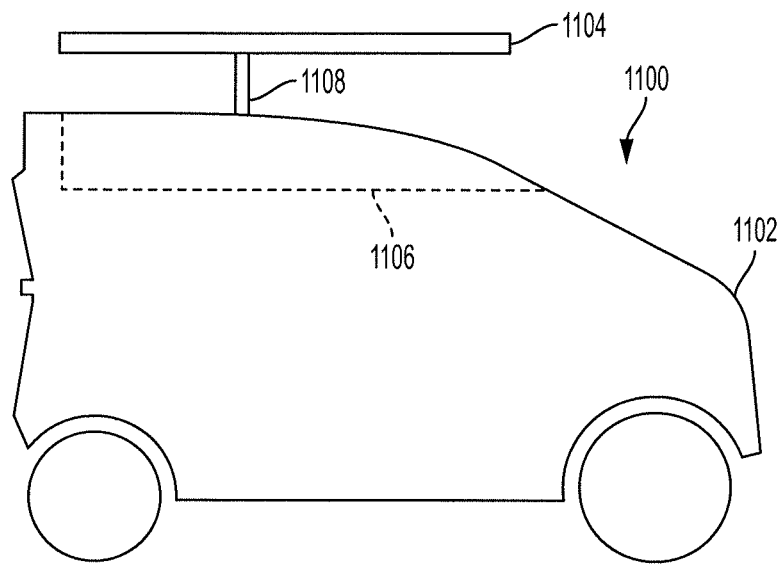
FIGS. 11A and 11B are drawings illustrating an exemplary personal vehicle having airfoils and an actuator coupled to the airfoils and designed to draw the airfoils into a frame of the personal vehicle according to an embodiment of the present invention.
Figure 11B:
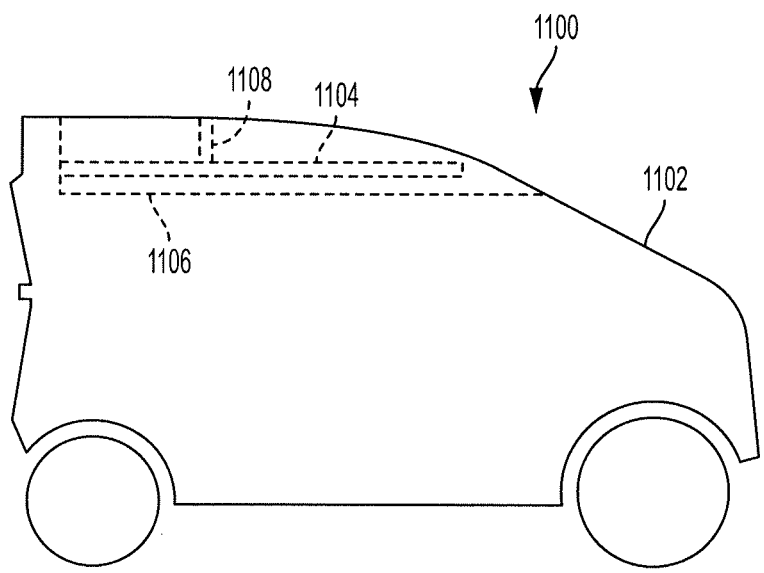

Referring now to FIGS. 3, 11A, and 11B, another personal vehicle 1100 is shown. The personal vehicle 1100 includes a frame 1102 and a plurality of airfoils 1104 that are used to transport the frame 1102 through the air (or through water). In that regard, the personal vehicle 1100 may be referred to as a flying personal vehicle (or watercraft personal vehicle).

The personal vehicle 1100 may further include a compartment 1106 defined by the frame 1102, and an actuator 1108 coupled to the frame 1102 and to the airfoils 1104.

When the personal vehicle 1100 is positioned on a platform, such as the platform 302 of FIG. 3, the actuator 1108 may cause the airfoils 1104 to be concealed or collapsed within the compartment 1106 to reduce friction between the airfoils 1104 and the air (or the water) during movement of the platform 302.

Figure 12A:
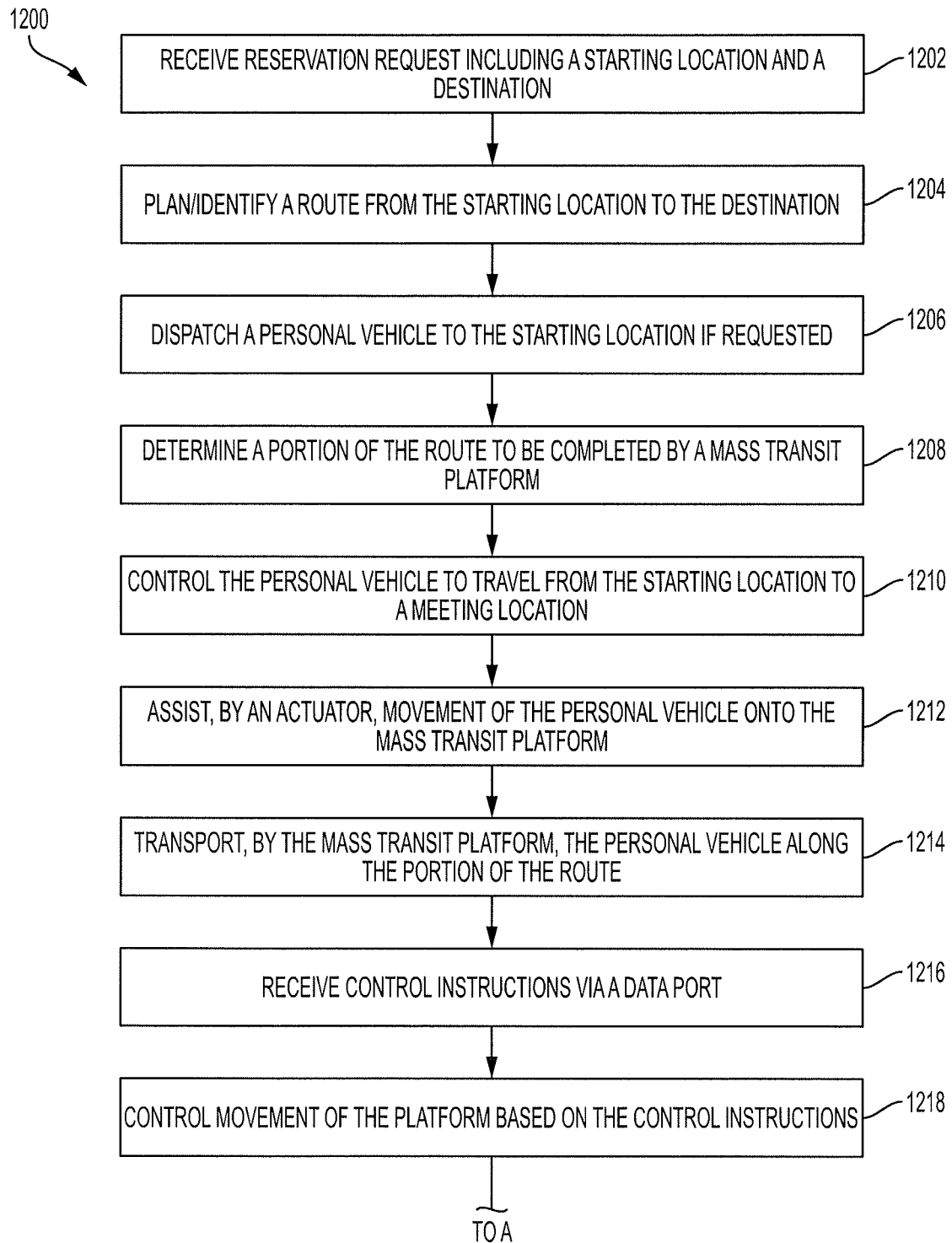
FIGS. 12A and 12B are flowcharts illustrating an exemplary method for mass transit of personal vehicles according to an embodiment of the present invention.
Figure 12B:
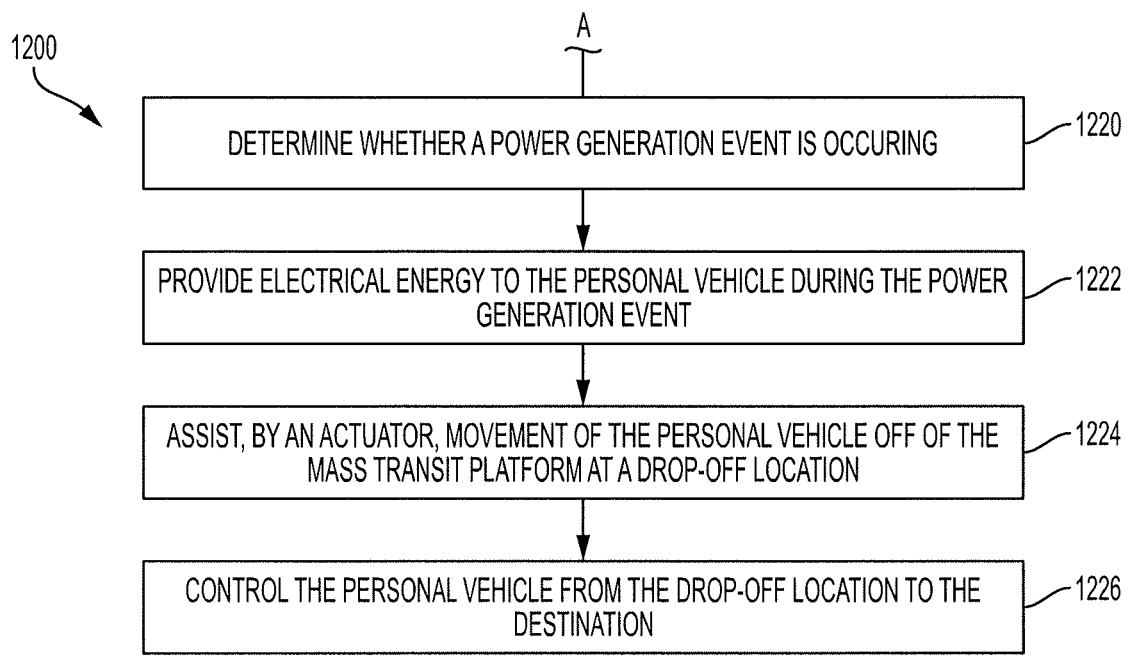

Turning now to FIGS. 12A and 12B, a method 1200 for mass transit of personal vehicles is shown. The method of 1200 may be performed by components of any of the systems described herein, such as by any ECUs, network access devices, personal vehicles, platforms, reservation servers, or the like.

In block 1202, a reservation server or a platform ECU may receive a reservation request corresponding to a request for a personal vehicle to be transported along at least a portion of a route from a starting location to a destination location by a platform. The reservation request may be transmitted by a personal vehicle or by a mobile device of a user of the personal vehicle. In some embodiments, the reservation request may include a request that the platform meet the personal vehicle at the current location of the personal vehicle, a request that the platform meet the personal vehicle at a predetermined meeting location, or that a personal vehicle be dispatched to pick up the user.

In some embodiments, the reservation request may be predicted by the personal vehicle and transmitted to the platform ECU or the reservation processor. For example, the personal ECU of the personal vehicle may be capable of predicting certain routes of the user, such as when the user is planning to drive to work. In response to predicting a route of the user, the personal vehicle may transmit a reservation request to allow the platform to transport the personal vehicle for at least a portion of the predicted route. In some embodiments, the personal vehicle may request verification from the user that the predicted route is correct prior to transmitting the reservation request.

In block 1204, a reservation processor or a platform ECU may plan, identify, or determine a route from the starting location to the destination location. The route may include one or more of a first portion that is to be traveled by the personal vehicle, a meeting point at which the personal vehicle will meet a platform, a second portion that is to be traveled by the platform, a drop off location at which the personal vehicle will be dropped off from the platform, and a final portion which will be traveled by the personal vehicle. The route may be planned, identified, or determined based on data included in the reservation request that was received in block 1202. For example, if the reservation request includes a request for the personal vehicle to be picked up at the current location of the personal vehicle then the meeting point will be the current location of the personal vehicle.

In some embodiments, multiple platforms may have pre-identified routes and schedules. The pre-identified routes may include certain stops at certain meeting locations. In that regard, a reservation request may not be required and personal vehicles may meet platforms at predetermined stops along the pre-identified routes.

In some embodiments and in block 1206, a personal vehicle may be dispatched to the starting location of the route if so requested in the reservation request. In some embodiments, the personal vehicle may be autonomous and may be automatically or autonomously driven to the starting location, which may be the current location of a user.

In block 1208, a portion of the route to be completed by the mass transit platform may be determined. For example, the portion of the route may correspond to a pre-identified route that the platform is designed to travel along. In some embodiments, the reservation server or the platform ECU may identify a portion of the route that will be completed by the mass transit platform based on multiple reservation requests from multiple personal vehicles. For example, the reservation server or the platform ECU may identify which portion of each route will be completed by the platform based on potential energy savings, convenience to each of the personal vehicles, time savings, or the like.

In block 1210, the personal vehicle may be controlled to travel from the starting location to a meeting location. The meeting location may correspond to a location at which the personal vehicle will meet the mass transit platform. In some embodiments, the personal vehicle may be autonomous or semi-autonomous and thus a personal ECU of the personal vehicle may control the personal vehicle to travel to the meeting point. In some embodiments, the driver of the personal vehicle may drive the personal vehicle to the meeting point. In some embodiments, a display of the personal vehicle may output navigation directions that a user may use to navigate the personal vehicle to the meeting point based on the route that was determined in block 1204.

In block 1212, an actuator coupled to, or otherwise associated with, the mass transit platform may assist movement of the personal vehicle onto the mass transit platform. For example, the actuator may be coupled to a ramp and may cause the ramp to be in a lowered position to allow the personal vehicle to drive onto the platform. As another example, the actuator may include a robot arm that picks up the personal vehicle and places the personal vehicle on the platform. As another example, the actuator may be coupled to a shaft or a pair of prongs and may lift the personal vehicle off of the ground surface. As another example, the actuator may be part of the vehicle movement bot and may lift the personal vehicle and move the personal vehicle onto a desired location on the platform.

In block 1214, the mass transit platform may transport the personal vehicle along the portion of the route. In some embodiments, the mass transit platform may be autonomous and may traverse the portion of the route without any operator controls. In some embodiments, the mass transit platform may be operated remotely such as from a central operating station, or from one of the personal vehicles located on the mass transit platform.

In some embodiments and in block 1216, the platform ECU of the mass transit platform may receive control instructions from one of the plurality of personal vehicles via a data port. The control instructions may correspond to desired control of the mass transit platform.

In block 1218, the platform ECU may control movement of the platform based on the received control instructions. In that regard, the personal vehicle may control the driving operations of the mass transit platform via the data port of the mass transit platform. In some embodiments, the first personal vehicle to be loaded onto the mass transit platform may have the ability to drive the mass transit platform. In that regard, other personal vehicles that are traveling along a similar route as the first personal vehicle may catch a ride on the mass transit platform in order to reduce total energy usage by all of the personal vehicles.

In some embodiments, the mass transit platform may provide an electrical charge to any personal vehicle that is located on mass transit platform. In some embodiments, the mass transit platform may only provide an electrical charge during certain events, such as during a power generation event.

In that regard and in block 1220, the platform ECU may determine whether a power generation event is occurring. The power generation event may correspond to an event in which one or more of an engine coupled to the platform is generating mechanical power or a motor generator coupled to the platform is converting power into electricity. For example, a power generation event may be signaled during regenerative braking, during conversion by the motor generator of torque into electrical energy, or the like.

In block 1222, the platform ECU may control transmitters of the platform to transmit electrical energy to the personal vehicles during the power generation event. In some embodiments, the platform ECU may control the transmitters of the platform to transmit the electrical energy to the personal vehicles regardless of whether the power generation event is occurring.

In some embodiments, the platform ECU may control the transmitters to transmit the electrical energy to the personal vehicles based on a priority ranking of the personal vehicles. The priority ranking may be based on one or more factors. These factors may include an order in which each of the personal vehicles are to be connected to the platform. For example, a first personal vehicle connected to the platform may be assigned a higher priority rating than later vehicles.

The ranking may be further based on a transfer of money from each of the plurality of personal vehicles to a payment system that is associated with the mass transit platform. For example, personal vehicles that pay a designated fee may be assigned to receive electrical energy from the transmitters of the mass transit platform. In some embodiments, personal vehicles that pay a higher fee may be assigned to receive a greater amount of electrical energy, or to receive electrical energy at a faster rate, than other personal vehicles.

The ranking may further be based on a points-based priority ranking. Such a points-based priority ranking may be similar to airline priority, such that personal vehicles that have amassed a greater quantity of points may have a higher priority for receiving electrical energy from the mass transit system.

The ranking may further be based on a current charge level of the energy storage device of each of the plurality of vehicles. In that regard, the platform ECU may be designed to transfer electrical energy to each of the personal vehicles to cause the energy storage device of each of the personal vehicles to have a relatively equal charge level. For example, personal vehicles having a lower charge level may be assigned a higher priority than personal vehicles having a greater charge level.

The ranking may be further based on a distance between a drop off location of each of the plurality of personal vehicles and a final destination of each of the plurality of personal vehicles. For example, the platform ECU may control power transfer to each of the personal vehicles to ensure that each of the personal vehicles has sufficient electrical energy to travel from the drop off location to their corresponding final destination.

The ranking may be further based on a drop off location of each of the vehicles. For example, vehicles that will be dropped off first may receive charge before vehicles that will be dropped off at a later point in time.

In block 1224, when the mass transit platform has reached the drop off location, the actuator of the mass transit platform may assist movement of the personal vehicle off of the mass transit platform. This assistance may be performed in a similar manner as performed in block 1212. For example, an actuator may cause a ramp to become lowered, a vehicle movement bot may move a personal vehicle off of the platform, a robot arm may move the personal vehicle off of the platform, or the like.

In block 1226, the personal vehicle may be controlled from the drop off location to the final destination. For example, such control may be performed by an operator of the personal vehicle. In some embodiments, the personal vehicle may be autonomous, and the personal ECU may control such driving of the personal vehicle from the drop off location to the final destination.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for facilitating mass transit of personal vehicles, comprising:
   a platform configured to mechanically support a plurality of personal vehicles;
   a power source coupled to the platform and configured to at least one of store or generate power to propel the platform, the power source including:
      a battery configured to store electricity,
      a motor generator configured to convert the electricity to the power and to convert torque into the electricity, and
      at least one of an engine, a fuel-cell generator, or a connector for receiving the electricity from an external source;
   an actuator coupled to the platform and configured to facilitate transfer of the plurality of personal vehicles from a ground surface to the platform;
   a plurality of transmitters each coupled to the platform and configured to transmit an electrical charge to an energy storage device of one of the plurality of personal vehicles; and
   a platform electronic control unit (ECU) coupled to the power source and the plurality of transmitters and configured to control the power source to transmit at least some of the power to the plurality of personal vehicles via the plurality of transmitters.

2. The system of claim 1 wherein the platform ECU is configured to control the plurality of transmitters to transmit the electrical charge to the energy storage device in response to at least one of the engine operating or the motor generator converting the torque into the electricity.

3. The system of claim 1 wherein the platform ECU is configured to control the plurality of transmitters to transmit the electrical charge to the plurality of personal vehicles based on a priority, the priority being determined based on at least one of:
   an order in which each of the plurality of personal vehicles became connected to the platform;
   a transfer of money from each of the plurality of personal vehicles to a payment platform associated with the system;
   a points-based priority ranking;
   a current charge level of the energy storage device of each of the plurality of personal vehicles; or
   a distance between a drop off location of each of the plurality of personal vehicles and a final destination of each of the plurality of personal vehicles.

4. The system of claim 1 wherein the platform is configured to at least one of:
   fly above the ground surface in a similar manner as an aircraft;
   be propelled through water in a similar manner as a watercraft; or
   be propelled along tracks in a similar manner as a train.

5. The system of claim 1 wherein the actuator is configured to lift a personal vehicle of the plurality of personal vehicles from the ground surface and to place the personal vehicle on the platform.

6. The system of claim 1 wherein the actuator includes a plurality of actuators each coupled to one of the plurality of transmitters such that an actuator/transmitter pair includes two prongs that:
   lift a personal vehicle of the plurality of personal vehicles from the ground surface in order to reduce friction between the personal vehicle and the ground surface during motion of the platform; and
   transmit the electrical charge to the energy storage device of the personal vehicle.

7. The system of claim 1 further comprising a plurality of transmitter actuators each coupled to one of the plurality of transmitters and configured to actuate each of the plurality of transmitters to be connected to a receiver of a corresponding personal vehicle of the plurality of personal vehicles in response to the corresponding personal vehicle being located on the platform.

8. The system of claim 1 further comprising:
   a drive train configured to utilize the power stored or generated by the power source to propel the platform; and
   a data port configured to receive control instructions from at least one of the plurality of personal vehicles, wherein the platform ECU is configured to control at least one of the power source or the drive train to propel the platform based on the control instructions received via the data port.

9. The system of claim 1 wherein the platform ECU is configured to control the power source to receive electrical power from at least one of the plurality of personal vehicles and to convert the electrical power received from the at least one of the plurality of personal vehicles into torque to propel the platform.

10. The system of claim 1 further comprising:
    a reservation server having a processor configured to receive a reservation request corresponding to a request for the platform to deliver one of the plurality of personal vehicles from a starting location to a destination location, and a server network access device coupled to the processor; and
    a platform network access device coupled to the platform ECU and configured to receive a signal from the server network access device corresponding to the reservation request, wherein the platform ECU is further configured to control the power source to propel the platform to the starting location to meet the one of the plurality of personal vehicles.

11. A system for facilitating mass transit of personal vehicles, comprising:
    a platform configured to mechanically support a plurality of personal vehicles;
    a power source coupled to the platform and configured to at least one of store or generate power to propel the platform, the power source including at least one of a motor generator configured to convert electricity into the power or an engine configured to convert a fuel into the power;
    an actuator coupled to the platform and configured to facilitate transfer of the plurality of personal vehicles from a ground surface to the platform;
    a plurality of transmitters each coupled to the platform and configured to transmit an electrical charge to an energy storage device of one of the plurality of personal vehicles; and
    a platform electronic control unit (ECU) coupled to the power source and the plurality of transmitters and configured to:
       control the power source to transmit at least some of the power to the plurality of personal vehicles via the plurality of transmitters, and
       control the plurality of transmitters to transmit the electrical charge to the energy storage device in response to at least one of the engine operating or the motor generator converting the torque into electricity.

12. The system of claim 11 wherein the platform ECU is configured to control the plurality of transmitters to transmit the electrical charge to the plurality of personal vehicles based on a priority, the priority being determined based on at least one of:
- an order in which each of the plurality of personal vehicles became connected to the platform;
- a transfer of money from each of the plurality of personal vehicles to a payment platform associated with the system;
- a points-based priority ranking;
- a current charge level of the energy storage device of each of the plurality of personal vehicles; or
- a distance between a drop off location of each of the plurality of personal vehicles and a final destination of each of the plurality of personal vehicles.

13. The system of claim 11 wherein at least one of:
the actuator is configured to lift a personal vehicle of the plurality of personal vehicles from the ground surface and to place the personal vehicle on the platform; or
the actuator includes a plurality of actuators each coupled to one of the plurality of transmitters such that an actuator/transmitter pair includes two prongs that:
- lift a personal vehicle of the plurality of personal vehicles from the ground surface in order to reduce friction between the personal vehicle and the ground surface during motion of the platform, and
- transmit the electrical charge to the energy storage device of the personal vehicle.

14. The system of claim 11 further comprising:
- a drive train configured to utilize the power stored or generated by the power source to propel the platform; and
- a data port configured to receive control instructions from at least one of the plurality of personal vehicles, wherein the platform ECU is configured to control at least one of the power source or the drive train to propel the platform based on the control instructions received via the data port.

15. The system of claim 11 wherein the platform ECU is configured to control the power source to receive electrical power from at least one of the plurality of personal vehicles and to convert the electrical power received from the at least one of the plurality of personal vehicles into torque to propel the platform.

16. The system of claim 11 further comprising:
- a reservation server having a processor configured to receive a reservation request corresponding to a request for the platform to deliver one of the plurality of personal vehicles from a starting location to a destination location, and a server network access device coupled to the processor; and
- a platform network access device coupled to the platform ECU and configured to receive a signal from the server network access device corresponding to the reservation request, wherein the platform ECU is further configured to control the power source to propel the platform to the starting location to meet the one of the plurality of personal vehicles.

17. A system for facilitating mass transit of personal vehicles, comprising:
- a platform configured to mechanically support a plurality of personal vehicles;
- a power source coupled to the platform and configured to at least one of store or generate power to propel the platform;
- a drive train configured to utilize the power stored or generated by the power source to propel the platform;
- an actuator coupled to the platform and configured to facilitate transfer of the plurality of personal vehicles from a ground surface to the platform;
- a plurality of transmitters each coupled to the platform and configured to transmit an electrical charge to an energy storage device of one of the plurality of personal vehicles; and
- a platform electronic control unit (ECU) coupled to the power source and the plurality of transmitters and configured to control the power source to transmit at least some of the power to the plurality of personal vehicles via the plurality of transmitters and to control at least one of the power source or the drive train to propel the platform.

18. The system of claim 17 further comprising:
- a reservation server having a processor configured to receive a reservation request corresponding to a request for the platform to deliver one of the plurality of personal vehicles from a starting location to a destination location, and a server network access device coupled to the processor; and
- a platform network access device coupled to the platform ECU and configured to receive a signal from the server network access device corresponding to the reservation request, wherein the platform ECU is further configured to control the power source to propel the platform to the starting location to meet the one of the plurality of personal vehicles.

* * * * *